US012771070B2

(12) United States Patent
Xiao

(10) Patent No.: US 12,771,070 B2
(45) Date of Patent: Oct. 20, 2026

(54) POP-UP CONNECTOR AND ELECTRONIC DEVICE

(71) Applicant: VIVO MOBILE COMMUNICATION CO., LTD., Guangdong (CN)

(72) Inventor: Junhui Xiao, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 360 days.

(21) Appl. No.: 18/543,248

(22) Filed: Dec. 18, 2023

(65) Prior Publication Data

US 2024/0120686 A1 Apr. 11, 2024

Related U.S. Application Data

(63) Continuation of application No. PCT/CN2022/098580, filed on Jun. 14, 2022.

(30) Foreign Application Priority Data

Jun. 18, 2021 (CN) ......................... 202110680044.3

(51) Int. Cl.
*H01R 13/639* (2006.01)
*H01R 13/453* (2006.01)
*H01R 13/502* (2006.01)

(52) U.S. Cl.
CPC ....... *H01R 13/639* (2013.01); *H01R 13/4538* (2013.01); *H01R 13/502* (2013.01)

(58) Field of Classification Search
None
See application file for complete search history.

(56) References Cited

U.S. PATENT DOCUMENTS

| | | | | |
|---|---|---|---|---|
| 3,449,706 A * | 6/1969 | Carissimi | H01R 13/5227 | 174/67 |
| 5,928,009 A * | 7/1999 | Lee | H01R 24/40 | 439/946 |
| 6,231,361 B1 * | 5/2001 | Ko | H01R 13/4538 | 439/171 |
| 7,695,294 B2 * | 4/2010 | Lu | H01R 13/4538 | 439/141 |
| 8,011,941 B2 * | 9/2011 | Sadick | H01R 13/52 | 439/271 |

(Continued)

FOREIGN PATENT DOCUMENTS

| | | |
|---|---|---|
| CN | 1770555 A | 5/2006 |
| CN | 1901293 A | 1/2007 |

(Continued)

*Primary Examiner* — Felix O Figueroa
(74) *Attorney, Agent, or Firm* — Price Heneveld LLP

(57) ABSTRACT

Provided are a pop-up connector and an electronic device. The pop-up connector comprises: a plugging part, a buckling part, and a locking part, where the plugging part is provided with a slot, and the slot is suitable for plugging and mating with a plug; where the buckling part is installed on the plugging part, and the buckling part is movable along an axial direction of the slot relative to the plugging part; the locking part is suitable for switching between a locked state and an unlocked state; where in the locked state, the buckling part is buckled with the locking part; and in the unlocked state, the locking part is not buckled with the buckling part.

20 Claims, 4 Drawing Sheets

(56) References Cited

U.S. PATENT DOCUMENTS

| | | | | |
|---|---|---|---|---|
| 8,092,240 | B2 * | 1/2012 | Houir Alami | H01R 13/5219<br>439/282 |
| 8,721,355 | B2 * | 5/2014 | Belack | H01R 13/44<br>439/141 |
| 8,764,458 | B1 * | 7/2014 | Rathi | H04M 1/0274<br>439/700 |
| 9,136,629 | B2 * | 9/2015 | Holland | H01R 24/525 |
| 9,225,114 | B2 * | 12/2015 | Sinclair | H01R 13/6276 |
| 9,524,837 | B2 * | 12/2016 | Froebel | H01H 33/12 |
| 2006/0099853 | A1 | 5/2006 | Sattele et al. | |
| 2007/0020973 | A1 | 1/2007 | Sattele et al. | |
| 2012/0108092 | A1 | 5/2012 | Li et al. | |
| 2015/0303620 | A1 | 10/2015 | Friesen | |
| 2017/0310038 | A1 | 10/2017 | Lam et al. | |

FOREIGN PATENT DOCUMENTS

| | | | |
|---|---|---|---|
| CN | 102025071 | A | 4/2011 |
| CN | 201887249 | U | 6/2011 |
| CN | 102868051 | A | 1/2013 |
| CN | 102983451 | A | 3/2013 |
| CN | 203445310 | U | 2/2014 |
| CN | 109921228 | A | 6/2019 |
| CN | 211907837 | U | 11/2020 |
| CN | 112310724 | A | 2/2021 |
| CN | 113422237 | A | 9/2021 |

* cited by examiner

POP-UP CONNECTOR AND ELECTRONIC DEVICE

CROSS-REFERENCE TO RELATED APPLICATIONS

This application is a continuation application of PCT Application No. PCT/CN2022/098580 filed on Jun. 14, 2022, which claims priority to Chinese Patent Application No. 2021106800443, with the China National Intellectual Property Administration on Jun. 18, 2021 and entitled "POP-UP CONNECTOR AND ELECTRONIC DEVICE", disclosures of which are incorporated herein by reference in their entireties.

TECHNICAL FIELD

This application belongs to the technical field of electronic products, and in particular relates to a pop-up connector and an electronic device.

BACKGROUND

With the continuous development of science and technology and the continuous improvement of people's living standards, electronic devices have gradually integrated into people's daily life. The TYPE-C connector has a much smaller volume than the Type-A connector and the Type-B connector, and is the latest USB interface standard. This interface has no difference between the front and back directions and can be plugged and unplugged at will.

TYPE-C connectors are widely used in mobile phones, tablets, notebook computers and other electronic products. TYPE-C connectors are standard devices, and the plug length is fixed at 6.65 mm. In this way, the TYPE-C connector occupies basically the same space in various electronic products along the direction of the plug while ensuring reliability.

In the process of implementing this application, the inventor found that in order to ensure the connection effect of the existing TYPE-C connector, a section of matching space is set between the plug and the tongue. Since this section of matching space is set inside the electronic device, it affects utilization of the internal space of the electronic product.

SUMMARY

In a first aspect, the embodiment of this application proposes a pop-up connector, including:

- a plugging part, where the plugging part is provided with a slot, and the slot is suitable for plugging and mating with a plug;
- a buckling part, where the buckling part is installed on the plugging part, and the buckling part is movable along an axial direction of the slot relative to the plugging part; and
- a locking part, provided on the plugging part and suitable for switching between a locked state and an unlocked state; where
- in the locked state, the buckling part is buckled with the locking part, and the buckling part at least partially overlaps with the plugging part; and
- in the unlocked state, the locking part is separated from the buckling part, and the buckling part is movable away from the plugging part along an axial direction of the slot.

In a second aspect, the embodiment of this application proposes an electronic device, including:

- a device body, where the device body is provided with an interface; and
- a pop-up connector, where the pop-up connector is installed in the interface; where
- in the locked state, the buckling part is located in the interface; and in the unlocked state, the buckling part is ejected out of the interface.

REFERENCE NUMERALS

Figure 1:
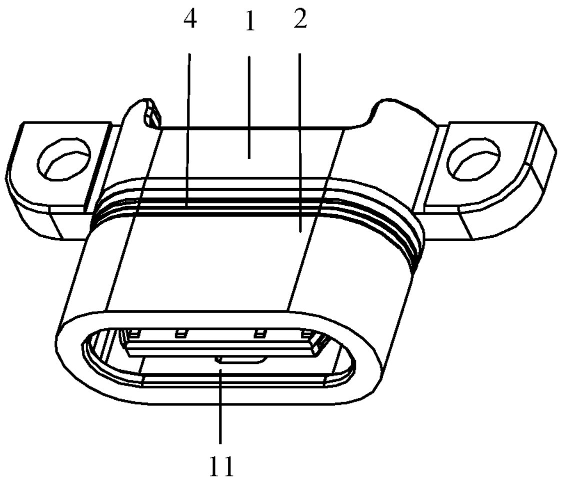
FIG. 1 is a schematic structural view of a pop-up connector in a locked state according to an embodiment of the present invention.

1: plugging part; 11: slot; 12: installation opening; 13: base; 14: tongue; 15: sealing ring; 16: first limiting buckle; 17: limiting step; 2: buckling part; 21: limiting groove; 22: limiting buckle; 3: locking part; 31: locking body; 310: locking protrusion; 32: reset part; 33: rotating shaft; 4: elastic piece; 41: reed; 5: plug; 6: device body; 7: pop-up connector.

DESCRIPTION OF EMBODIMENTS

The following describes in detail the embodiments of the present invention. Examples of the embodiments are illustrated in the accompanying drawings. Reference numerals which are the same or similar throughout the accompanying drawings represent identical or similar elements or elements having identical or similar functions. The embodiments described below with reference to the accompanying drawings are exemplary, and are only intended to explain the present invention and should not be understood as a limitation of the present invention. All other embodiments obtained by a person of ordinary skill in the art based on the embodiments of this application without creative efforts shall fall within the protection scope of this application.

Features of terms “first” and “second” in the specification and claims of this application may explicitly or implicitly include one or more such features. In the description of the present invention, unless otherwise specified, “a plurality of” means at least two.

In the description of the present invention, it should be noted that, unless expressly specified and defined otherwise, terms such as “mounted”, “connected with each other”, and “connected with” should be understood in a broad sense. For example, “connection” may be a fixed connection, a detachable connection, or an integral connection; or may be a mechanical connection or an electrical connection; or may be a direct connection, an indirect connection through an intermediate medium, or a connection between two elements. A person of ordinary skill in the art may understand specific meanings of the above terms in the present invention based on a specific situation.

The following describes the pop-up connector proposed according to the embodiment of the present invention with reference to FIG. 1 to FIG. 4. According to user needs, the pop-up connector can be set as a Type-A connector, a Type-B connector or a Type-C connector.

Figure 2:
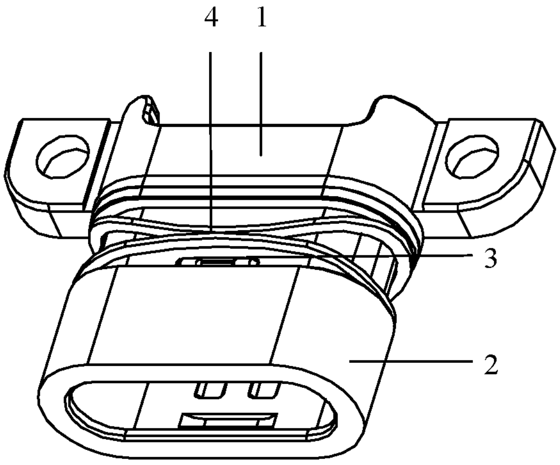
FIG. 2 is a schematic structural view of a pop-up connector in an unlocked state according to an embodiment of the present invention.

As shown in FIG. 1 and FIG. 2, according to some embodiments of the present invention, a pop-up connector is provided, and the pop-up connector includes: a plugging part 1, a buckling part 2 and a locking part 3.

Specifically, the plugging part 1 is used for direct connection with a plug, and a slot 11 is provided in the plugging part 1, and the slot 11 is suitable for plugging and mating with the plug. The buckling part 2 is mounted on the plugging part 1, and the buckling part 2 is movable relative to the plugging part 1 along the axial direction of the slot 11. The locking part 3 is provided on the plugging part 1, and the locking part 3 is used to lock the telescopic length of the buckling part 2 relative to the plugging part 1, and can control the plugging part 1 and the buckling part 2 to switch between the unlocked state and unlocked state when the plug is inserted.

Figure 3:
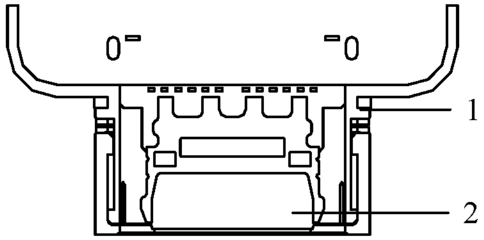
FIG. 3 is a top view of a pop-up connector in a locked state according to an embodiment of the present invention.

When the plug is not inserted into the pop-up connector, as shown in FIG. 1 and FIG. 3, the locking part 3 is in a locked state for locking the plugging part 1 and the buckling part 2, and the buckling part 2 and the plugging part 1 overlap at least partially. At this time, the locking part 3 locks the distance between the buckling part 2 and the plugging part 1.

Figure 4:
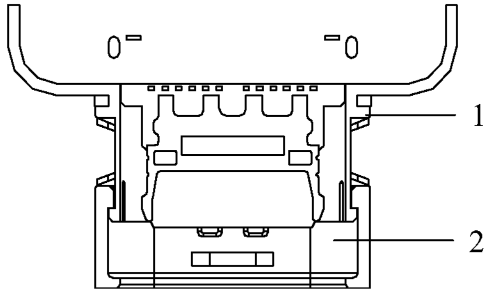
FIG. 4 is a top view of a pop-up connector in an unlocked state according to an embodiment of the present invention.

When the plug is inserted into the pop-up connector, as shown in FIG. 2 and FIG. 4, the locking part 3 is unlocked under the pressing force of the plug and is separated from the buckling part 2, the buckling part 2 is movable away from the plugging part 1 along the axial direction of the slot 11, after the buckling part 2 moves to the farthest distance relative to the plugging part 1, the ejected buckling part 2 and the plugging part 1 constitute a complete connector structure, the buckling part 2 is sheathed on the plug as a matching space for plug insertion, and the plug is inserted into the slot 11 through the matching space and connected with the plugging part 1.

It should be noted that, in order to reduce the length of the pop-up connector, in the locked state, according to the lengths of the plugging part 1 and the buckling part 2, the entire buckling part 2 and a part of the plugging part 1 can overlap, or the entire plugging part 1 and a part of the buckling part 2 can overlap, or the entire buckling part 2 and the entire plugging part completely overlap. Since the plugging part 1 is directly used to connect to the plug, generally the length of the plugging part 1 is greater than the length of the buckling part 2. On this basis, in order to reduce the length of the pop-up connector, in the locked state, the entire buckling part 2 and a part of the plugging part 1 can overlap.

According to the pop-up connector of the embodiment of the present invention, by splitting the connector into a plugging part and a buckling part connected by an elastic member, the buckling part can be ejected or retracted relative to the plugging part, and the locking part is provided to lock or unlock the plugging part and the buckling part, so that the connector can eject the buckling part when the plug is inserted, and the mating space used for connecting the plug originally and set inside the electronic device can be set outside the electronic device. In this way, the internal space of the electronic product is saved, and the utilization of the internal space of the electronic product is improved.

Figure 5:
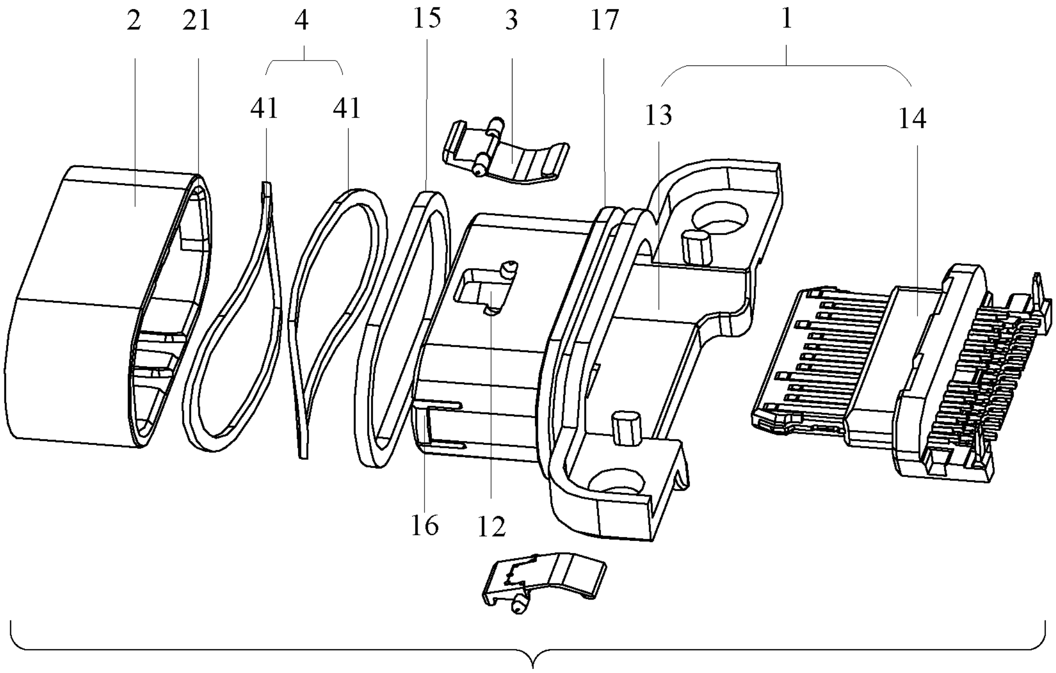
FIG. 5 is an exploded view of a pop-up connector according to an embodiment of the present invention.

According to an optional embodiment of the present invention, as shown in FIG. 5, the pop-up connector further includes: an elastic member 4 installed between the buckling part 2 and the plugging part 1.

In the locked state, the buckling part 2 compresses the elastic member 4 and buckles with the locking part 3, the elastic member 4 is in a compressed state and is compressed between the buckling part 2 and the plugging part 1, and the buckling part 2 and the plugging part 1 overlap at least partially. At this time, the locking part 3 locks the distance between the buckling part 2 and the plugging part 1.

In the unlocked state, the elastic member 4 drives the buckling part 2 to move away from the plugging part 1 along the axial direction of the slot 11. After the buckling part 2 moves to the farthest distance relative to the plugging part 1, the elastic member 4 resets, so that the plugging part 1 ejects the buckling part 2 along the deformation direction of the elastic member 4. At this time, the elastic member 4 is in a partially compressed state or in a natural state, is supported between the buckling part 2 and the plugging part 1, the ejected buckling part 2 and the plugging part 1 form a complete connector structure, and the buckling part 2 is sheathed on the plug.

The plugging part 1 is provided with a limiting step 17, and the limiting step 17 is used to cooperate with the buckling part 2 to fix the elastic member 4. A first end of the elastic member 4 abuts against the buckling part 2, and a second end of the elastic member 4 abuts against the limiting step 17. In the unlocked state, the first end of the elastic member 4 abuts against the buckling part 2 to drive the buckling part 2 to move relative to the plugging part 1 through elastic force.

The elastic member 4 can use a reed 41, and the reed 41 is sheathed on the plugging part 1. In the locked state, the reed 41 is supported between the limiting step 17 and the buckling part 2 in a compressed state. In the unlocked state, the reed 41 resets, and the reed 41 is supported between the limiting step 17 and the buckling part 2 in a partially compressed state or in a natural state. The first end of the reed 41 abuts with the buckling part 2, and the second end of the reed 41 abuts against the limiting step 17.

In order to enhance the external thrust of the elastic member 4, a plurality of reeds 41 can generally be set, and adjacent reeds 41 have opposite elastic directions. In this embodiment, two reeds 41 are provided, so that after the plugging part 1 and the buckling part 2 are unlocked, the two reeds 41 deform in opposite directions, increasing the overall deformation of the elastic member 4, thereby increasing the external thrust of the elastic member 4.

Based on the above-mentioned embodiments, according to the pop-up connectors provided by some other embodiments of the present invention, as shown in FIG. 5, a side wall of the plugging part 1 is provided with the installation opening 12 connected with the slot, the locking part 3 is rotatably connected with a side wall of the installation opening 12, and the locking part 3 controls the plugging part 1 and the buckling part 2 to switch between the locked state and the unlocked state according to the rotating position of the locking part 3.

Figure 6:
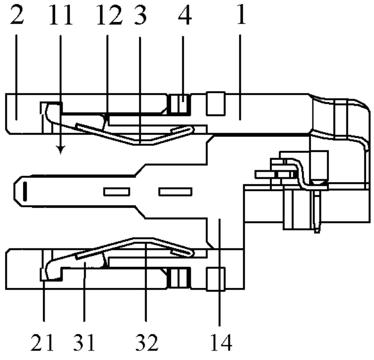
FIG. 6 is a schematic diagram of a pop-up connector when a plug is not inserted according to an embodiment of the present invention.

In this embodiment, as shown in FIG. 6, when the plug is not inserted into the pop-up connector, the locking part 3 engages the plugging part 1 and the buckling part 2, and the plugging part 1 and the buckling part 2 are in a locked state.

Figure 7:
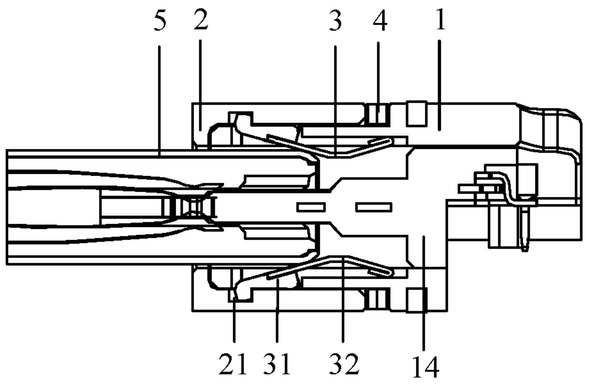
FIG. 7 is a schematic diagram of a pop-up connector when a plug is just inserted into the pop-up connector according to an embodiment of the present invention.

When the plug is just inserted into the pop-up connector, as shown in FIG. 7, the plug 5 is in contact with the locking part 3, causing the locking part 3 to rotate in the installation opening 12.

Figure 8:
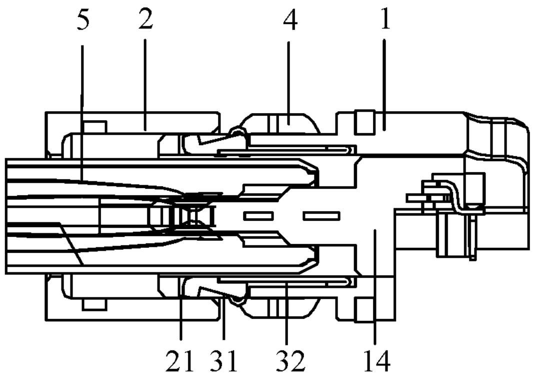
FIG. 8 is a schematic diagram of a pop-up connector when a plug is partially inserted into the pop-up connector according to an embodiment of the present invention.
Figure 9:
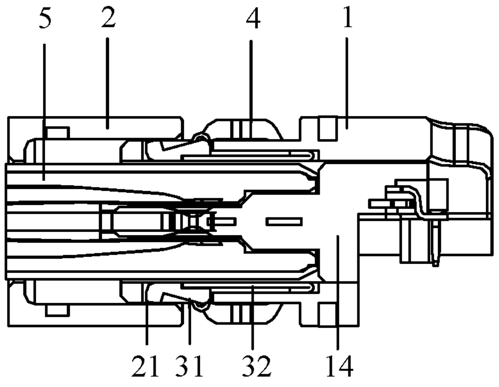
FIG. 9 is a schematic diagram of a pop-up connector when a plug is completely inserted into the pop-up connector according to an embodiment of the present invention.
Figure 10:
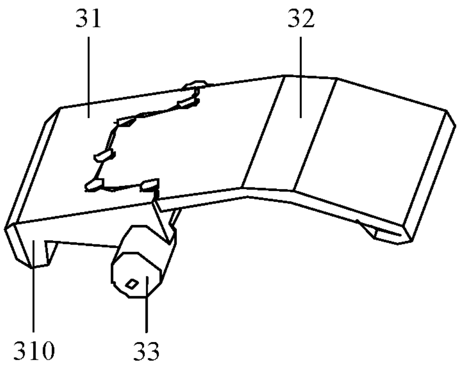
FIG. 10 is a schematic diagram of a locking part according to an embodiment of the present invention.

When rotating to a certain angle, as shown in FIG. 8, the locking part 3 is unlocked, and at this time, the elastic member 4 exerts an outward thrust on the buckling part 2, the plugging part 1 and the buckling part 2 are in the unlocked state, and the buckling part 2 is ejected relative to the plugging part 1 until the buckling part 2 is ejected to the maximum telescopic length. As shown in FIG. 9, the buckling part 2 is fixed relative to the plugging part 1. The buckling part 2 is sheathed on the plug and serves as a matching space for the plug 5 to be inserted into. The plug 5 passes through the matching space and is inserted into the slot 11 to connect with the plugging part 1.

If the plug 5 is pulled out at this time, the plugging part 1 and the buckling part 2 are not ejected back automatically, and the plugging part 1 and the buckling part 2 are still in the unlocked state. The elastic member 4 can be compressed to the initial state by pressing the buckling part 2, and at the same time the locking part 3 is pressed by the buckling part 2 to return to the original rotation angle. At this time, the locking part 3 can lock the plugging part 1 and the buckling part 2 again, causing the entire pop-up connector to be locked again.

Further, as shown in FIG. 5 to FIG. 10, the locking part 3 includes: a locking body 31 and a reset part 32. At least one side of the locking body 31 is provided with a rotating shaft 33, and the locking body 31 is hinged with the side wall of the installation opening 12 through the rotating shaft 33. The reset part 32 is connected with the locking body 31, the reset part 32 is bent toward one side of the plugging part 1, and a contact position is formed at the bent position, so that when the plug 5 is inserted into the slot 11, the contact position can contact the plug 5.

In this embodiment, each component in the locking part 3 can adopt metal injection molding (MIM). After components are formed, they are combined with the stamping technology to form the locking body 31 and the reset part 32. Finally, the locking body 31 and the reset part 32 are welded through a welding process.

The two opposite sides on the locking body 31 are hinged with the side wall of the installation opening 12 through a rotating shaft 33. The reset part 32 can be an elastic piece, the elastic piece is bent, and a bent position of the elastic piece toward the plugging part 1 is a contact position.

When the plug 5 is not inserted into the slot 11, the reset part 32 is in a natural state, and its contact position extends into the slot 11, and the locking body 31 is buckled with the buckling part 2, so that the plugging part 1 and the buckling part 2 are in the locked state, and the elastic member 4 is compressed between the inserting part 1 and the buckling part 2.

When the plug 5 is fully inserted into the slot 11, the contact position abuts against the plugging part 1, the contact position is pressed outwards from the plugging part 1, the reset part 32 is deformed in the direction of the force, and is bent and is close to the side wall of the slot 11, the plug 5 is pressed tightly in the slot 11 at the same time, and the rotating shaft 33 is used as the support of the locking body 31 and the reset part 32. Under the action of the moment, the locking body 31 rotates along a direction opposite to the force of the reset part 32, so that the locking body 31 is separated from the buckling part 2. Under the action of the elastic member 4, the buckling part 2 is ejected relative to the plugging part 1. At this time, the plugging part 1 and the buckling part 2 are in the unlocked state.

In order to ensure that the force of the plug 5 in the slot 11 is balanced and stable, the coaxiality of the plugging part 1 and the buckling part 2 is improved at the same time. Further, a plurality of installation openings 12 communicating with the slot 11 can be provided on the same plugging part 1, and the plurality of installation openings 12 are symmetrically arranged on the same plane of the plugging part 1, ensuring that each installation opening 12 is far from the buckle part 2 are the same distance.

Correspondingly, a plurality of locking parts 3 are provided to lock the plugging part 1 and the buckling part 2. In order to enable each locking part 3 to be locked or unlocked at the same time, each locking part 3 is in one-to-one correspondence with the installation opening 12. When the plug 5 is not inserted into the slot 11, all the locking parts 3 are used to lock the plugging part 1 and the buckling part 2. When the plug 5 is fully inserted into the slot 11, all locking parts 3 are unlocked, and the buckling part 2 is ejected relative to the plugging part 1.

Optionally, as shown in FIG. 5 to FIG. 10, one of the locking body 31 and the buckling part 2 is provided with a locking protrusion 310, and the other is provided with a limiting groove 21 that cooperates with the locking protrusion 310, one of the locking protrusion 310 and the limiting groove 21 is disposed on the locking body 31, and the other of the locking protrusion 310 and the limiting groove 21 is disposed on the buckling part 2.

In this embodiment, the locking protrusion 310 is disposed on the locking body 31, and the limiting groove 21 is disposed on the buckling part 2. Since the locking body 31 is in contact with the side wall of the installation opening 12 through the rotating shaft 33, when the locking protrusion 310 is located in the limiting groove 21, the locking body 31 fixes the buckling part 2 and the plugging part 1. When the locking protrusion 310 is located outside the limiting groove 21, under the action of the elastic member 4, the buckling part 2 is ejected relative to the plugging part 1.

Specifically, as shown in FIG. 6, when the plug 5 is not inserted into the pop-up connector, the locking projection 310 of the locking body 31 is located in the limiting groove 21, the locking body 31 fixes the buckling part 2 and the plugging part 1, and the plugging part 1 and the buckling part 2 are in a locked state.

When the plug 5 is just inserted into the pop-up connector, as shown in FIG. 7, the plug 5 is in contact with the contact position, the reset part 32 is deformed under pressure in the direction of the force, the rotating shaft 33 is used as a support for the locking body 31 and the reset part 32, and under the action of the moment, the locking body 31 starts to rotate in the direction opposite to the force of the reset part 32.

When rotating to a certain angle, as shown in FIG. 8, the locking projection 310 of the locking body 31 rotates out of the limiting groove 21, the elastic member 4 exerts an outward thrust on the buckling part 2, the plugging part 1 and the buckling part 2 are in the unlocked state, and the buckling part 2 is ejected relative to the plugging part 1 until the buckling part 2 is ejected to the maximum telescopic length. As shown in FIG. 9, the buckling part 2 is fixed relative to the plugging part 1. The buckling part 2 is sheathed on the plug 5 and serves as a matching space for the plug 5 to be inserted into. The plug 5 passes through the matching space and is inserted into the slot to connect with the plugging part 1.

If the plug 5 is pulled out at this time, the plugging part 1 and the buckling part 2 are not ejected automatically, and the plugging part 1 and the buckling part 2 are still in the unlocked state. By pressing the buckle part 2, the elastic member 4 can be compressed to the initial state, and at the same time, the locking body 31 returns to the initial rotation angle, and the locking protrusion 310 of the locking body 31 rotates into the limiting groove 21. At this time, the locking part 3 locks the plugging part 1 and the buckling part 2 again, so that the whole pop-up connector is in the locked state again.

In an example according to the present invention, as shown in FIG. 5 to FIG. 9, the buckling part 2 is a bushing, and the bushing is made by metal injection molding process combined with numerical control machining.

The bushing generally adopts the form of an outer bushing, and the outer bushing is telescopically sheathed outside the plugging part 1. The inner wall of the outer bushing is provided with a limiting groove 21 that cooperates with the locking protrusion 310. When the locking protrusion 310 is located in the limiting groove 21, the locking body 31 fixes the outer bushing and the plugging part 1.

If the form of the outer bushing is adopted, as shown in the above-mentioned embodiment, the outer bushing is arranged outside the slot 11, and the locking part 3 is rotatably connected with the side wall of the installation opening 12 by arranging, on the side wall of the plugging part 1, the installation opening 12 connected with the slot 11, so that when the plug 5 is inserted into the slot 11, the plugging part 1 and the outer bushing are unlocked.

The bushing can also be in the form of an inner bushing according to needs, and the inner bushing is telescopically sheathed in the plugging part 1. The outer wall of the inner bushing is provided with a limiting groove 21 that cooperates with the locking protrusion 310. When the locking protrusion 310 is located in the limiting groove 21, the locking body 31 fixes the inner bushing and the plugging part 1.

If the inner bushing is used, the inner bushing pops out of the slot 11 in the unlocked state, and at least a part of the inner bushing is located in the slot 11 in the locked state. At this time, the side wall of the plugging part 1 is provided with the installation opening 12 communicating with the slot 11, or the side wall of the inner bushing is provided with the installation opening 12 communicating with the slot 11, and the locking part 3 is rotatably connected with the side wall of the installation opening 12 correspondingly, so that when the plug 5 is inserted into the slot 11, the plugging part 1 and the inner bushing are unlocked.

Optionally, in order to limit the maximum telescopic length of the plugging part 1 and the buckling part 2, a first limiting buckle 16 can be provided on the plugging part 1, and a second limiting buckle 22 cooperating with the first limiting buckle 16 may be set on the buckling part 2 correspondingly. In the unlocked state, the first limiting buckle 16 is engaged with the second limiting buckle 22 to lock the maximum telescopic length between the plugging part 1 and the buckling part 2.

According to some embodiments of the present invention, as shown in FIG. 5 to FIG. 9, the plugging part 1 includes: a base 13. A first end of the base 13 is provided with a slot 11 for inserting a plug, and the buckling part 2 is telescopically connected with the first end of the base 13, and a second end of the base 13 is used for connecting with the device body. The base 13 can be in the form of a bracket and supported and connected in the device body.

The plugging part further includes: a tongue 14, the tongue 14 is connected with the base 13, the connection end of the tongue 14 and the plug 5 is located in the slot 11, and a safety distance is set between the tongue 14 and the end surface of the buckling part 2, to avoid the tongue 14 from being exposed and damaged. The tongue 14 is provided with a plurality of connection pins and a plurality of connection terminals electrically connected with each other. When the plug 5 is fully inserted into the slot 11, the plug 5 is electrically connected with each connection terminal in the tongue 14. Under the condition that the tongue 14 is not exposed, the pop-up connector can be ejected relative to the device body by about 2 mm, which is equivalent to saving about 2 mm of internal space of the device body.

In order to ensure the tightness between the pop-up connector and the device body, as shown in FIG. 5, a sealing ring 15 can also be added to the plugging part 1. By setting the limit structure of the sealing ring 15 on the base 13, the sealing ring 15 is sheathed on the base 13 and fixed by the limit structure, so that the sealing ring 15 seals the gap between the base 13 and the device body, so as to avoid that the internal components of the device body are in direct contact with the outside.

An electronic device is proposed according to an embodiment of the present invention. The electronic device can be a mobile phone, a tablet, a computer, an electronic watch and the like.

Now taking a mobile phone as an example, as shown in FIG. 11 to FIG. 14, the electronic device includes: a device body 6 and a pop-up connector 7. One side of the device body 6 is provided with an interface, and the pop-up connector 7 is installed in the interface.

As shown in FIG. 1 to FIG. 4, the pop-up connector 7 includes: a plugging part 1, a buckling part 2 and a locking part 3. The plugging part 1 is used for direct connection with a plug, and the plugging part 1 is provided with a slot 11 suitable for inserting a plug. The buckling part 2 is movable along the axial direction of the slot 11 relative to the plugging part 1. The locking part 3 is provided on the plugging part 1, and the locking part 3 is used to lock the telescopic length of the plugging part 1 and the buckling part 2, and can control the plugging part 1 and the buckling part 2 to switch between the unlocked state and unlocked state when the plug is inserted.

Figure 11:
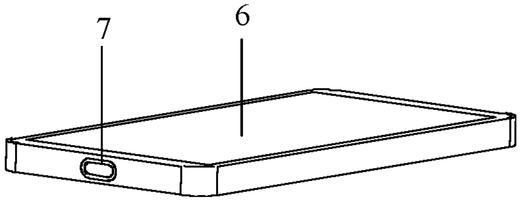
FIG. 11 is a schematic structural diagram of a pop-up connector in a locked state in an electronic device according to an embodiment of the present invention.

When the plug 5 is not inserted into the pop-up connector 7, as shown in FIG. 11, the locking part is in a locked state for locking the plugging part and the buckling part, and the buckling part compresses the elastic member and buckles with the locking part, the elastic member is in a compressed state and is compressed between the buckling part and the plugging part, and the buckling part and the plugging part overlap at least partially. At this time, the locking part locks the distance between the buckling part and the plugging part, and the buckling part is located at the interface.

Figure 12:
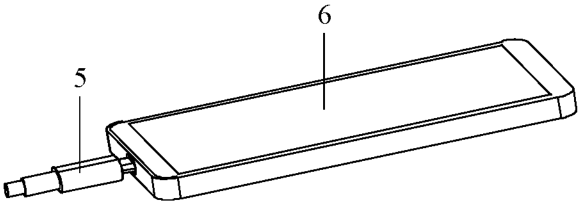
FIG. 12 is a schematic diagram of a plug partially inserted into an electronic device according to an embodiment of the present invention.

When the plug is just inserted into the pop-up connector 7, as shown in FIG. 12, the buckling part is still located in the interface.

Figure 13:
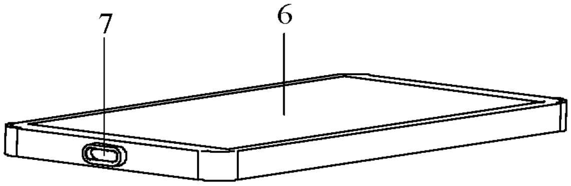
FIG. 13 is a schematic structural diagram of a pop-up connector in an unlocked state in an electronic device according to an embodiment of the present invention.
Figure 14:
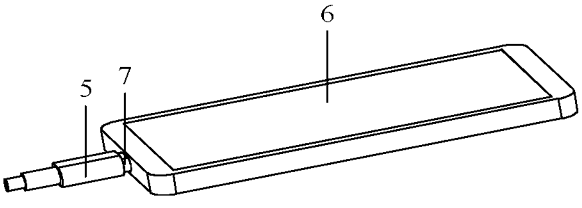
FIG. 14 is a schematic diagram of a plug fully inserted into an electronic device according to an embodiment of the present invention.

When the plug is fully inserted into the pop-up connector 7, as shown in FIG. 13 and FIG. 14, the locking part is separated from the buckling part, and the elastic member resets and the buckling part is ejected relative to the plugging part. At this time, the elastic member is in a partial compressed state or natural state and is supported between the buckling part and the plugging part, the ejected buckling part and the plugging part constitute a complete connector structure, the buckling part is sheathed on the plug as a matching space for plug insertion, the plug is inserted into the slot through the matching space and connected with the plugging part, and the buckling part is ejected out of the interface.

It can be understood that, for the specific structure of the pop-up connector 7, refer to the relevant text descriptions in the above-mentioned FIG. 1 to FIG. 10, and details will not be repeated here.

According to the electronic device according to the embodiment of the present invention, since the electronic device is provided with the above-mentioned pop-up connector, the connector can eject the buckling part when the plug is inserted, so that the matching space originally provided inside the electronic device for connecting the plug can be arranged outside the electronic device, so as to save the internal space of the electronic product and improve the utilization of the internal space of the electronic product.

It can be understood that other components and operations of the electronic device according to the embodiment of the present invention, such as a tablet and a computer, are known to those skilled in the art, and will not be described in detail here.

In the description of this specification, the description with reference to terms such as "an embodiment", "some embodiments", "a schematic embodiment", "an example", "a specific example", or "some examples" means that specific features, structures, materials, or characteristics described in combination with the embodiments or examples are included in at least one embodiment or example of the present invention. In this specification, the schematic descriptions of the above terms do not necessarily refer to the same embodiment or example. Moreover, the specific features, structures, materials, or characteristics described may be combined in a proper way in any one or more embodiments or examples.

Although the embodiments of the present invention have been shown and described, those of ordinary skill in the art can understand that various changes, modifications, replacements, and variants may be made to these embodiments without departing from the principle and purpose of the present invention, and the scope of the present invention is limited by the claims and their equivalents.

What is claimed is:

1. A pop-up connector, comprising:

a plugging part, wherein the plugging part is provided with a slot, and the slot is suitable for plugging and mating with a plug;

a buckling part, wherein the buckling part is installed on the plugging part, and the buckling part is movable along an axial direction of the slot relative to the plugging part; and a locking part, provided on the plugging part and suitable for switching between a locked state and an unlocked state; wherein the locking part comprises a locking body and a reset part, the locking body is provided with a rotating shaft, the reset part is connected with the locking body, the reset part is bent towards one side of the plugging part, and a contact position is formed at the bent part;

in the locked state, the buckling part is buckled with the locking part, the buckling part at least partially overlaps with the plugging part, the reset part is in a free state, the contact position extends into the slot, and the locking body is buckled with the buckling part; and in the unlocked state, the locking part is not buckled with the buckling part, the buckling part is movable away from the plugging part along the axial direction of the slot, the moved buckling part and the plugging part form a matching space for the plug to be inserted into, the contact position abuts against the plug, and the locking body is not buckled with the buckling part.

2. The pop-up connector according to claim 1, wherein an installation opening communicating with the slot is provided on a side wall of the plugging part, and the locking part is rotatably connected with the installation opening.

3. The pop-up connector according to claim 2, wherein the locking body is connected with a side wall of the installation opening through the rotating shaft.

4. The pop-up connector according to claim 3, wherein one of the locking body and the buckling part is provided with a locking protrusion, the other is provided with a limiting groove that cooperates with the locking protrusion, one of the locking protrusion and the limiting groove is disposed on the locking body, and the other is disposed on the buckling part.

5. The pop-up connector according to claim 1, wherein the pop-up connector further comprises:

an elastic member, wherein the elastic member is installed between the buckling part and the plugging part;

in the locked state, the buckling part compresses the elastic member and buckles with the locking part; and in the unlocked state, the elastic member drives the buckling part to move away from the plugging part along the axial direction of the slot.

6. The pop-up connector according to claim 5, wherein a limiting step is provided on the plugging part, a second end of the elastic member abuts against the limiting step, and in the unlocked state, a first end of the elastic member abuts against the buckling part to drive the buckling part to move.

7. The pop-up connector according to claim 6, wherein the elastic member is a reed, and the reed is sheathed on the plugging part, a second end of the reed abuts against the limiting step, and in the unlocked state, a first end of the reed abuts against the buckling part.

8. The pop-up connector according to claim 7, wherein there are a plurality of reeds, and adjacent reeds have opposite elastic force directions.

9. The pop-up connector according to claim 1, wherein the plugging part comprises:

a base, wherein a first end of the base is provided with the slot for inserting the plug, the buckling part is telescopically connected with the first end of the base, and a second end of the base is used for connecting with a device body.

10. The pop-up connector according to claim 9, wherein the plugging part further comprises:

a tongue, connected with the base, wherein the connecting end of the tongue and the plug is located in the slot.

11. The pop-up connector according to claim 9, wherein the plugging part further comprises:

a sealing ring, wherein the sealing ring is sheathed on the base, and is used to seal a gap between the base and the device body.

12. The pop-up connector according to claim 1, wherein the buckling part is an outer bushing, and the outer bushing is telescopically sheathed outside the plugging part.

13. An electronic device, comprising:

a device body, wherein the device body is provided with an interface; and a pop-up connector, wherein the pop-up connector is installed in the interface, and the pop-up connector comprises:

a plugging part, wherein the plugging part is provided with a slot, and the slot is suitable for plugging and mating with a plug;

a buckling part, wherein the buckling part is installed on the plugging part, and the buckling part is movable along an axial direction of the slot relative to the plugging part; and a locking part, provided on the plugging part and suitable for switching between a locked state and an unlocked state; wherein the locking part comprises a locking body and a reset part, the locking body is provided with a rotating shaft, the reset part is connected with the locking body, the reset part is bent towards one side of the plugging part, and a contact position is formed at the bent part;

in the locked state, the buckling part is buckled with the locking part, the buckling part at least partially overlaps with the plugging part, the reset part is in a free state, the contact position extends into the slot, and the locking body is buckled with the buckling part; and in the unlocked state, the locking part is not buckled with the buckling part, the buckling part is movable away from the plugging part along the axial direction of the slot, the moved buckling part and the plugging part form a matching space for the plug to be inserted into, the contact position abuts against the plug, and the locking body is not buckled with the buckling part;

wherein in the locked state, the buckling part is located in the interface; and in the unlocked state, the buckling part is ejected out of the interface.

14. The electronic device according to claim 13, wherein an installation opening communicating with the slot is provided on a side wall of the plugging part, and the locking part is rotatably connected with the installation opening.

15. The electronic device according to claim 14, wherein the locking body is connected with a side wall of the installation opening through the rotating shaft.

16. The electronic device according to claim 15, wherein one of the locking body and the buckling part is provided with a locking protrusion, the other is provided with a limiting groove that cooperates with the locking protrusion, one of the locking protrusion and the limiting groove is disposed on the locking body, and the other is disposed on the buckling part.

17. The electronic device according to claim 13, wherein the pop-up connector further comprises:

an elastic member, wherein the elastic member is installed between the buckling part and the plugging part;

in the locked state, the buckling part compresses the elastic member and buckles with the locking part; and in the unlocked state, the elastic member drives the buckling part to move away from the plugging part along the axial direction of the slot.

18. The electronic device according to claim 17, wherein a limiting step is provided on the plugging part, a second end of the elastic member abuts against the limiting step, and in the unlocked state, a first end of the elastic member abuts against the buckling part to drive the buckling part to move.

19. The electronic device according to claim 18, wherein the elastic member is a reed, and the reed is sheathed on the plugging part, a second end of the reed abuts against the limiting step, and in the unlocked state, a first end of the reed abuts against the buckling part.

20. The electronic device according to claim 19, wherein there are a plurality of reeds, and adjacent reeds have opposite elastic force directions.

* * * * *